June 19, 1962 H. W. HARMAN 3,039,182
METHOD OF REPAIRING CRACKED ELEMENTS
Filed March 31, 1959 2 Sheets-Sheet 1

INVENTOR.
HAL W. HARMAN

BY *Schmeding & Fultz*

ATTORNEYS

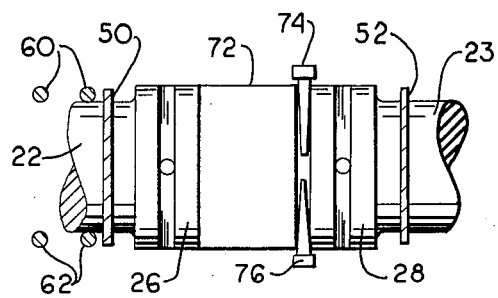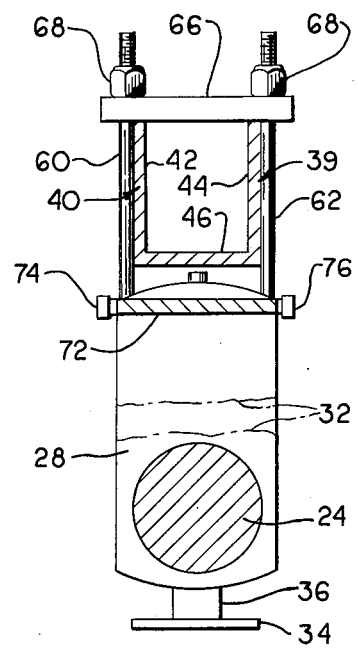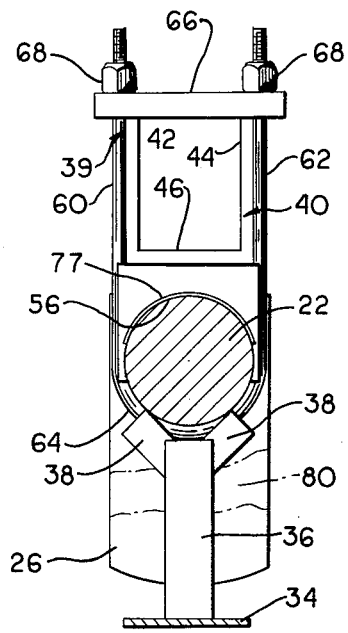

United States Patent Office 3,039,182
Patented June 19, 1962

3,039,182
METHOD OF REPAIRING CRACKED ELEMENTS
Hal W. Harman, 1214 Texas St., El Paso, Tex., assignor of one-sixth to Warren H. F. Schmieding and one-sixth to Palmer Fultz, both of Columbus, Ohio
Filed Mar. 31, 1959, Ser. No. 803,300
8 Claims. (Cl. 29—402)

The present invention relates to a method of repairing a cracked element which element is formed of material that fuses and which shrinks upon cooling. More particularly the present invention relates to a method of repairing cracked metal, such as iron or steel casting, steel, and forgings. The present invention is particularly useful in the repair of cracked webs of crank shafts.

In practicing the present invention, I rout out, for example by fusing, all of the material of the element, bounding the crack. I then deform the element, under extraneous pressure, to such degree as to substantially compensate for the shrinking of the new material which is to replace the material which had been removed. I then place new material under fusing heat in the area where the original material was removed while the element is held in the said deformed position. Then, after the new material is cooled to below fusing temperature, I relieve the element of the said extraneous pressure.

The present invention, as previously stated, is useful particularly in repairing cracks in the webs of large and expensive, forged crank shafts. In such structures, after the material, immediately bounding the crank, is removed, those ends of complementing webs which are attached to the main shaft sections are either spread apart or pulled together, depending on which side of a web the cracking took place, and held in such deformed position while fused metal is being added to replace that which had been removed.

Further objects and advantages will be apparent from the following description, reference being had to the accompanying drawings wherein a preferred embodiment of the invention is illustrated.

In the drawings:

FIG. 3 is a cross-sectional view taken on line 3—3 of FIG. 2;

FIG. 4 is a cross-sectional view taken on line 4—4 of FIG. 2; and

FIG. 5 is a cross-sectional view taken on line 5—5 of FIG. 2.

Figure 2:
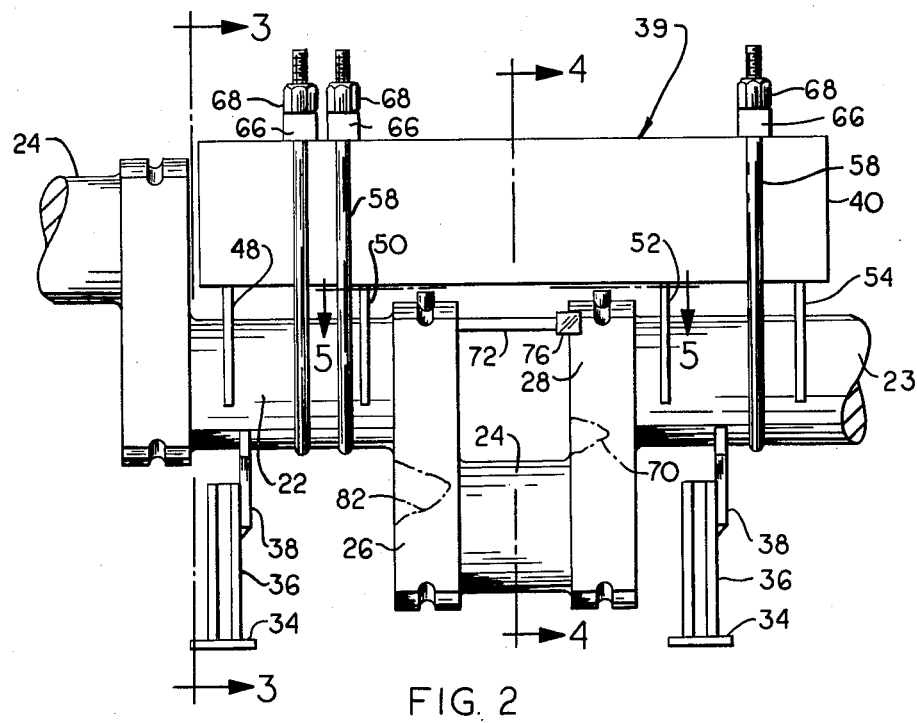
FIG. 2 is a side view of supports for the crank shaft, a fragmentary view of the chank shaft and a jig or clamp for deforming or holding parts of the crank shaft.

Referring more in detail to the drawings the crank shaft is generally shown at 20 including the main shaft sections 22 and 23, the throw 24 and the left web 26 and right web 28 which connect the throw 25 with the main shaft sections 22 and 23. For various reasons the web is cracked, for example such cracking may be caused by the wearing of bearings or the misalignment of the bearings of the main shaft sections 22 and 23, and such crack often occurs as is shown at 30. Usually this crack extends completely across the web.

Figure 1:
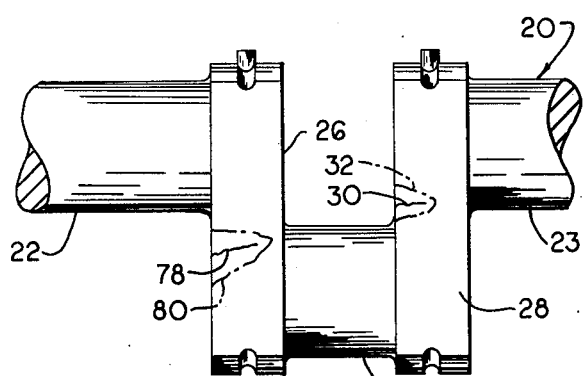
FIG. 1 is a fragmentary view of a crank shaft showing a crack in one of the webs.

In practicing the invention, all material immediately bounding the crack 30 is removed in any suitable manner to form a cavity, as for example by fusing the metal immediately bounding the crack, or any other suitable way. The part removed is shown by the dot and dash lines 32 in FIG. 1 or by full lines as shown in FIG. 4. After this material is removed, the crank shaft is suitably supported on a plurality of supports, two of which are shown in FIG. 2. They each comprise a base 34, an upright 36 and arms 38, disposed at approximately ninety degrees to one another.

A jig 39 is employed for clamping the shaft sections 22 and 23 in certain positions with respect to one another, as will be more fully explained hereinafter. This jig 39 includes a U-shaped steel beam 40 including upright legs 42 and 44 and a bottom connecting yoke 46. Steel plates 48, 50, 52 and 54 are suitably secured as by welding their upper edges to the underside of the yoke 46 of the beam 40. These plates are spaced longitudinally along the length of the beam 40 but extend transversely of the beam, and the undersides thereof are semi-circularly shaped as is shown at 56 in FIG. 3. The radius of the circle 56 is the same as the radius of the shaft sections 22 and 23 so that the inner surface of the plates 48, 50, 52 and 54 snugly fit over the shaft sections 22 and 23. U-shaped bolts 58 are provided for clamping the shaft sections 22 and 23 to the jig 39. These U-shaped bolts include legs 60 and 62 and a yoke 64. The yoke of each U-bolt is semi-circular in shape, the radius thereof being equal to the radius of the shaft sections 22 and 23, and snugly fits the underside of the shaft sections 22 and 23. The legs 60 and 62 of U-bolt 58 extend through an elongated block 66. Nuts 68 are threaded on the ends of the bolts and when drawn tightly, force the beam 40 downwardly resulting in the plates 48, 50, 52 and 54 being pushed into tightened engagement with the top of shaft sections 22 and 23.

New steel is filled into the routed out portion 32 and this is done by fusing the metal. Inasmuch as substituted new metal will shrink after cooling, I compensate for such shrinkage by deforming the crank shaft to such degree as to compensate for shrinking of the new metal. This can be accomplished in several ways; one such way is by wedging parts of the crank shaft away from one another. The new metal is defined by the dash and dot lines in FIG. 2 and shown at 70. Obviously when this metal shrinks, it will tend to distort the crank shaft. If the new metal is placed as shown at 70 in FIG. 2 to replace the portion that has been routed out, upon cooling, the shrinking of this new metal will tend to distort the web 28 to the left causing the shaft section 23 to move in a counterclockwise direction and of course out of alignment with the other shaft section 22. To compensate for this shrinkage, I slightly distort the alignment of the shaft sections 22 and 23 by spreading the upper parts of the webs 26 and 28. This I accomplished by the use of a plate 72 and a wedge or wedges 74 and 76. I have found through actual practice that for every cubic inch of new material 70 to be added I spread the upper ends of the webs 26 and 28 about .0075 to .001 of an inch. I have found that after the new metal 70 is cooled and the wedge is removed, the shaft sections 22 and 23 are realigned. Another manner of spreading the upper edges of the webs 26 and 28, is by placing a shim 77 between the upper periphery of the shaft section 22 and the plate 58, or a shim between the upper periphery of the other shaft 22 and the plate 54, or by placing shims between the shaft sections 22 and the plates 48 and 54 and then drawing the intermediate portions of the shaft sections 22 and 23 upwardly by the bolts 68. Again the spreading should be .0075 to .001 of an inch for every cubic inch of new material added.

If the crack should be on the outside of a web such as that shown at 78 in FIG. 1, again all of the old metal immediately bounding the crack 78 is removed as indicated by the dot and dash line 80, and new metal added by fusion or welding process. Here the shrinkage of this new metal would tend to spread the upper parts of the webs 26 and 28. To compensate for this I again slightly distort the relative positions of the shaft sections 22 and 23 and pull the upper ends of the webs toward one another during the building up of the new metal shown in dash and dot lines 82 in FIG. 2. I accomplish this distortion by placing shims either between the upper periphery of the shaft section 22 and the plate 50, or the other shaft section 23 and the plate 52, or by placing shims between the shaft sections and the plates 50 and 52. Then by drawing the bolts 68, the shaft section 22 will be moved in a clockwise direction and the other shaft section 23 will be moved in a counterclockwise direction.

After the old metal is routed out to remove the cracked section, the metal thereabout is gradually heated to approximately 400 degrees Fahrenheit. This can be done after the jig 39 is placed in position and preferably the distortion of the shaft is accomplished after this metal has been heated to the 400 degrees F. During the fusing operation, of course, the welding metal as well as the metal of the web defining the cavity which had been routed, is heated to fusing temperature and the cavity is gradually filled. The means for distorting the shaft is then removed either by removing the wedge or wedges or the shims, as the case may be. After the distorting means is withdrawn, the bolts 68 are again tightened and, inasmuch as the semi-circular portions of the plates 48, 50, 52 and 54 are aligned, the shaft sections 22 and 23 are of necessity brought into alignment. Should there be a slight misalignment between the shaft sections 22 and 23, then the adjacent environment of the webs 26 and 28 and the throw 24 are slowly heated to a temperature of approximately 1200 degrees F. so as to free the molecules to attain perfect shaft section alignment. Then the heated portion is permitted to cool and the cooling is deterred so that it takes place from the 1200 degrees F. to room temperature in approximately twelve hours.

As previously stated, in routing out the old material about the crack 30, it is preferable to maintain the cavity of equal depth and width throughout the width of the web since this will simplify the distorting through the plate 72 and wedges 74 and 76, but should the crack be at such location in the web that it is inconvenient to form a uniform width and depth cavity throughout the width of the web, in that event it is desirable to drive one wedge inwardly farther than the other. For example in referring to FIG. 4, should the right side of the cavity 32 have a greater area than the left side, of course the shrinkage on the right side would be greater than on the left side. In that event the wedge 76 would be driven in slightly more than the wedge 74.

The present invention is particularly useful in repairing large crank shafts such as those employed on large diesel engines and in power plants wherein the crank shaft is usually formed of drop forging and originally cost in the thousands of dollars. By my present invention I have been able to repair broken and cracked castings at a fraction of the cost of a new crank shaft. In many instances the repaired crank shaft is better than a new one in that in the new one quite often internal stresses are present in the metal and under severe strain is apt to crack or break; whereas in many instances after the strain has been released by the cracking and by my method of repairing, the strain does not reoccur.

While the form of embodiment herein shown and described constitutes a preferred form, it is to be understood that other forms may be adopted falling within the scope of the claims that follow.

I claim:

1. The method of repairing a cracked element which is formed of material that fuses and which shrinks upon cooling, such as repairing a cracked metallic web of a crank shaft, which method comprises removing all material of the element immediately bounding the crack, heating the metal around the cracked portion to approximately 400 degree Fahrenheit and distorting the element under extraneous pressure approximately .0075 of an inch for every cubic inch of new metal to be added and in a direction opposite to the direction of shrinkage by cooling of the new metal which is to replace the metal which had been removed, placing new metal under fusing heat in the area where the original metal was removed while the element is held in said distorted position, and thereafter relieving the element of said extraneous pressure.

2. The method of repairing a cracked web of a crank shaft, which comprises removing all metal of the web immediately bounding the crack, heating the web around the cracked portion to approximately 400 degrees Fahrenheit and distorting the crank shaft under extraneous pressure approximately .0075 of an inch for every cubic inch of new metal to be added and in a direction opposite to the direction of shrinkage by cooling of the new metal which is to replace the metal which has been removed, placing new metal under fusing heat in the area where the original material was removed while the crank shaft is held in said distorted position, and thereafter relieving the crank shaft of said extraneous pressure.

3. The method of repairing a cracked web of a crank shaft wherein the crack is in that side of a web which confronts its complementing web, which method comprises removing all metal of the web immediately bounding the crack; heating the web around the cracked portion to approximately 400 degrees Fahrenheit and spreading, by extraneous pressure, those ends of the complementing webs, which are connected with the main shaft sections, approximately .0075 of an inch for every cubic inch of the new metal which is to replace the metal which has been removed, placing new metal under fusing heat in the area where the original material was removed while the webs are so spread, and thereafter relieving the crank shaft of said extraneous pressure.

4. The method of repairing a cracked web of a crank shaft wherein the crack is in that side of a web opposite the side which confronts its complementing web, which method comprises removing all metal of the web immediately bounding the crack; heating the web around the cracked portion to approximately 400 degrees Fahrenheit and distorting the crank shaft under extraneous pressure approximately .0075 of an inch for every cubic inch of new metal to be added by pulling those ends of the complementary webs, which are connected with the main shaft section, towards one another, placing new metal under fusing heat in the area where the original material was removed while the webs are held in such distorted position, and thereafter relieving the crank shaft of said extraneous pressure.

5. The method as defined in claim 1, characterized to include a following step of slowly heating the element to a temperature of approximately 1200 degrees Fahrenheit and then slowly cooling the element to room temperature in approximately twelve hours.

6. The method as defined in claim 2, characterized to include a following step of slowly heating the webs and throw of the crank shaft to a temperature of approximately 1200 degrees Fahrenheit and then slowly cooling the webs and throw to room temperature in approximately twelve hours.

7. The method as defined in claim 3, characterized to include a following step of slowly heating the webs and throw of the crank shaft to a temperature of approximately 1200 degrees Fahrenheit and then slowly cooling the webs and throw to room temperature in approximately twelve hours.

8. The method as defined in claim 4, characterized to include a following step of slowly heating the webs and throw of the crank shaft to a temperature of approximately 1200 degrees Fahrenheit and then slowly cooling the webs and throw to room temperature in approximately twelve hours.

References Cited in the file of this patent

UNITED STATES PATENTS

| | | |
|---|---|---|
| 1,989,695 | Jensen | Feb. 5, 1935 |
| 2,632,944 | Kittelson | Mar. 31, 1953 |
| 2,751,671 | Welch | June 26, 1956 |